United States Patent
Roberts

[15] 3,655,938
[45] Apr. 11, 1972

[54] DYNAMIC SPOT WELDER

[72] Inventor: Robert J. Roberts, 9833 Moyers, Houston, Tex. 77042

[22] Filed: Apr. 22, 1970

[21] Appl. No.: 30,874

[52] U.S. Cl. ............................................. 219/87, 219/81
[51] Int. Cl. .................................................... B23k 11/10
[58] Field of Search ............... 219/86, 78, 119, 120, 81, 84, 219/87

[56] References Cited

UNITED STATES PATENTS

| 1,580,401 | 4/1926 | Borgadt | 219/84 |
| 3,420,976 | 1/1969 | Morris et al. | 219/59 X |

FOREIGN PATENTS OR APPLICATIONS

| 200,054 | 7/1967 | U.S.S.R. | 219/84 |

*Primary Examiner*—J. V. Truhe
*Assistant Examiner*—J. G. Smith
*Attorney*—William E. Ford

[57] ABSTRACT

Dynamic electrical resistance spot welding apparatus according to the present invention comprises a support that may be of linear or circular configuration and defines an elongated work station. Strip material to be spot welded moves continuously through the work station and may be wound about a circular mandrel that may form the support. A rotatable welding element which may be a wheel is disposed with its periphery adjacent the work station and is provided with a plurality of recesses formed about the periphery thereof. Each recess retains a welding head in movable relation therein that is biased outwardly away from the recess so that the welding head may move against the bias upon contacting the material to be welded. Each welding head is provided with a pair of electrodes that are connected electrically to a source of electrical potential through a pair of brushes carried by the welding element. The electrical circuitry is completed upon engagement between the electrodes and the material and welding is accomplished by heat developed by the electrical current passing through the resistance defined by the material. The welding heads engage the material in such manner that mechanical pressure is varied throughout movement of the material through the work station to achieve heating, fusion, and solidification of the material under mechanical pressure as it moves through the work station. Additionally, the electrical circuitry may be provided with a timing control to achieve heating and cooling of the material as it moves through the work station if desired.

9 Claims, 7 Drawing Figures

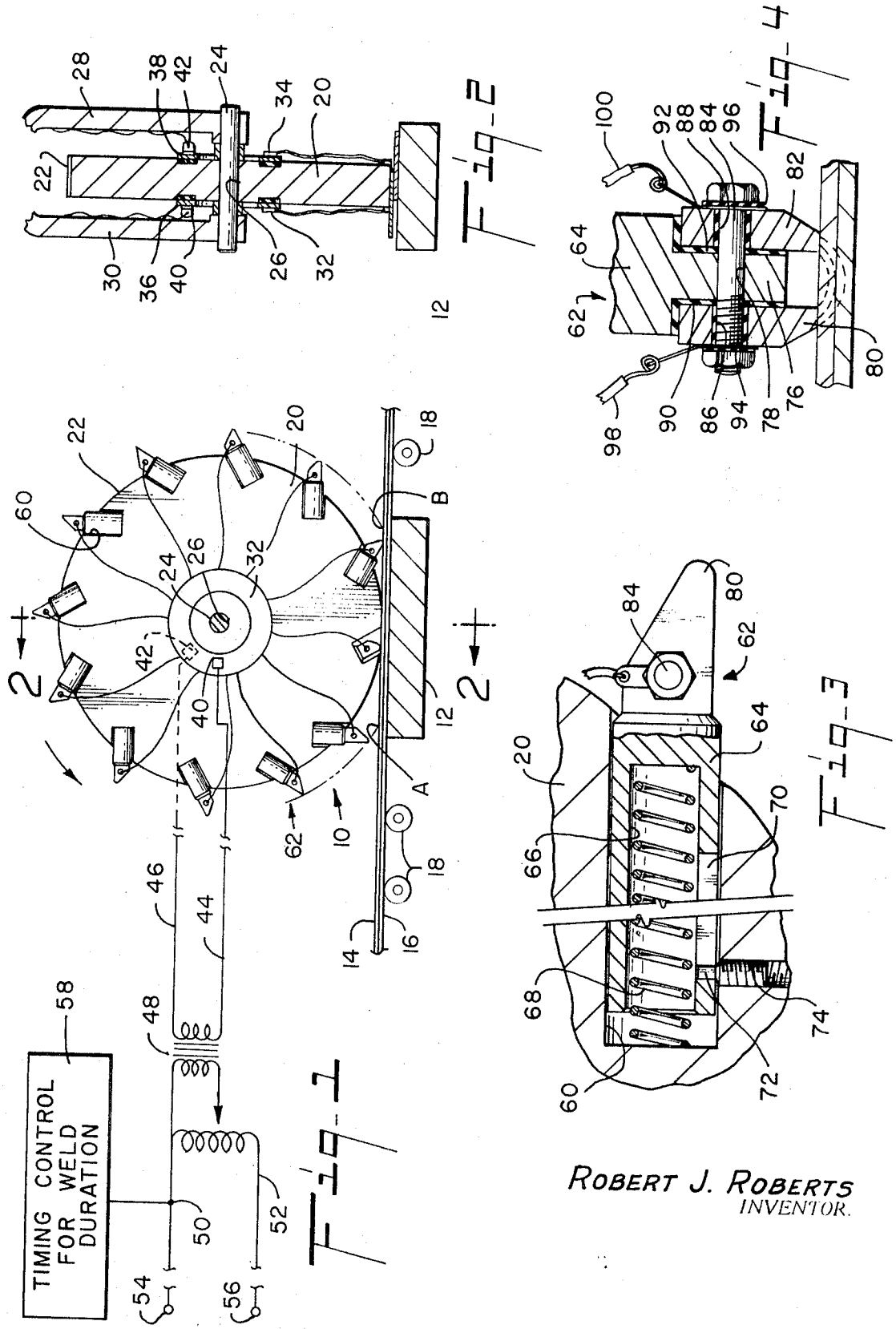

Patented April 11, 1972

ROBERT J. ROBERTS
INVENTOR.

3,655,938

DYNAMIC SPOT WELDER

BACKGROUND OF THE INVENTION

This invention is directed generally to spot welding apparatus and more specifically to spot welding apparatus that is capable of achieving a proper spot weld on strip work that is moving continuously. A strong and solid spot weld will be developed if there is sufficient thermal penetration to develop sufficient heat to penetrate the material being welded and if the material being welded is maintained under sufficient mechanical pressure for a sufficient length of time. It is necessary that the metal be allowed to melt and fuse together slowly to achieve a proper bond. If the metal is heated too rapidly the metal will tend to burn thereby destroying the metal at the weld point and thereby severely limiting the strength of the weld. It is further necessary that the metals being welded be maintained in firm contact during both the heating and cooling phases thereof to assure proper fusion of the metal and maintenance of the fused condition as the molten metal solidifies into a proper bonded joint.

Heretofore it has been impractical to achieve a desired spot weld on strip material that is moving rapidly and continuously through a work station because it has not been practical to maintain the material being welded under pressure for sufficient time and under conditions of sufficient thermal penetration to achieve thorough fusion and solidification of the materials being joined. It has been necessary therefore that spot welding mechanisms travel at extremely slow speeds or travel intermittently to achieve proper spot welding.

SUMMARY OF THE INVENTION

It is therefore a primary object of the present invention to provide novel dynamic electrical resistance spot welding apparatus that is capable of achieving proper spot welds on strip material moving rapidly and continuously through a work station.

It is a further object of the present invention to provide novel dynamic electrical resistance spot welding apparatus having a plurality of welding heads that engage work moving through a work station and maintain contact with the work at all times during travel of the work through the work station.

It is an even further object of the present invention to provide novel dynamic electrical resistance spot welding apparatus that is capable of maintaining proper mechanical pressure between the welding heads and material to achieve proper heating and cooling during the welding cycle.

Among the several objects of the present invention is noted the contemplation of novel dynamic electrical resistance spot welding apparatus that is capable of varying the flow of electrical current through the material being welded during passage of the material through the work station to achieve proper fusion and solidification of the material under conditions of mechanical pressure.

Another object of the present invention includes the provision of novel dynamic electrical resistance spot welding apparatus having an electrical timing control to insure proper application of heat during the welding cycle.

It is an even further object of the present invention to provide novel dynamic electrical resistance spot welding apparatus capable of welding material passing linearly through a work station or being wound on a rotatable mandrel.

It is also another object of the present invention to provide novel dynamic electrical resistance spot welding apparatus that is simple in nature, low in cost, and reliable in use.

The above and other objects and novel features of the instant invention will be readily apparent from the following description taken in conjunction with the accompanying drawings. It is to be expressly understood that the drawings are provided for the purpose of illustration and are not intended to define the limits of the invention but rather merely illustrate preferred embodiments and structures incorporating the features of the instant invention.

BRIEF DESCRIPTION OF THE DRAWINGS

In the accompanying drawings forming a part of this specification and wherein like reference numerals are employed to designate like parts:

FIG. 1 is a fragmentary elevational view of a spot welding machine having a rotatable welding element constructed in accordance with the present invention and schematically illustrating the electrical circuitry therefor.

FIG. 2 is a sectional view of the spot welding apparatus of this invention taken along line 2—2 in FIG. 1.

FIG. 3 is a fragmentary sectional view of a portion of the rotatable welding element of FIG. 1 illustrating one of the welding heads in detail.

FIG. 4 is a fragmentary sectional view of the welding head structure of FIG. 3 illustrating the electrodes thereof in contact with superposed strips of material and illustrating passage of current through the strip material.

BRIEF DESCRIPTION OF THE INVENTION

Figure 5:
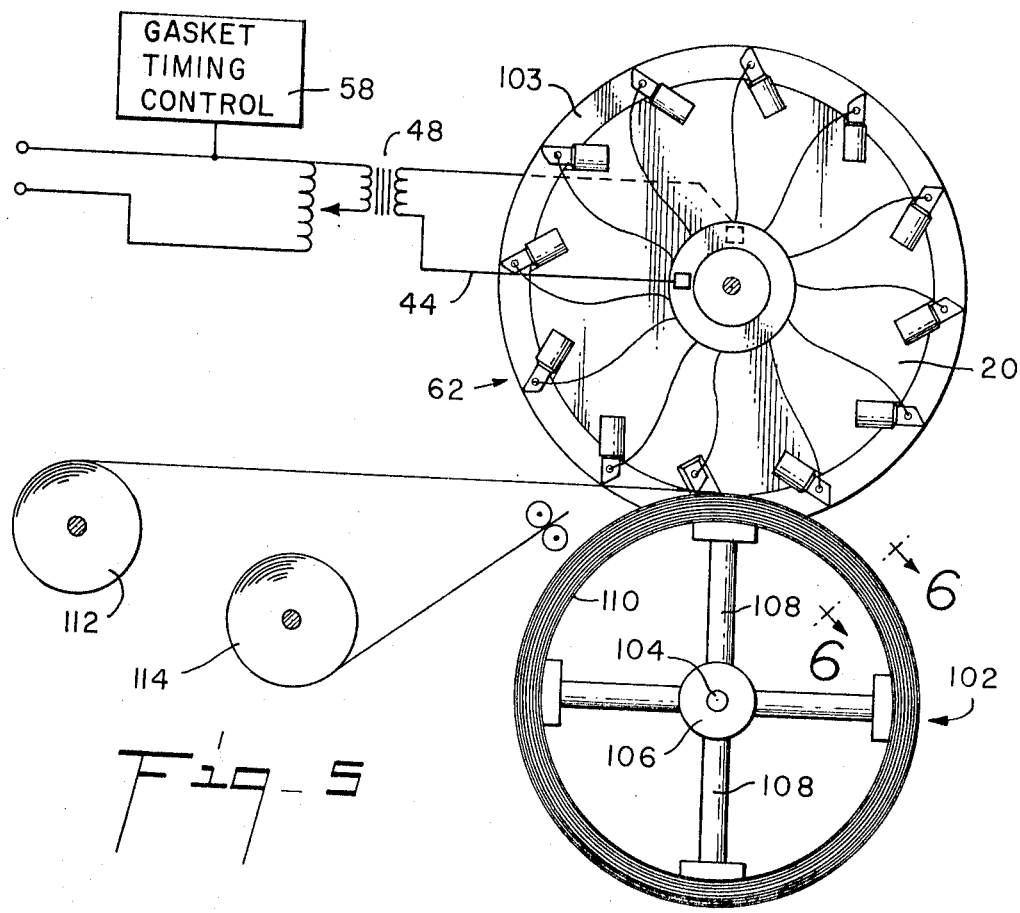
FIG. 5 is an elevational view of spot welding apparatus defining a modified embodiment of the present invention and illustrating simultaneous winding and spot welding of strips of material and schematically illustrating electrical circuitry for the welding apparatus.

Briefly the invention concerns dynamic electrical resistance spot welding apparatus including a support defining a work station through which material to be welded moves continuously. A rotatable element is disposed adjacent the support and carries a plurality of spaced movable welding heads that engage the material and maintain engagement with the material as it travels through the work station. Contact pressure between the welding heads and the material is varied as the material moves through the work station in order to achieve heating and fusion of the material as the material moves through a portion of the work station. Solidification of the fused material is achieved during travel thereof through the remaining portion of the work station. Heating, fusion and solidification of the material are all accomplished under mechanical pressure between the welding heads and the material being welded to assure a proper bond. If desired the welding cycle may be varied by a welding sequence control device that is provided in the electrical circuitry.

DETAILED DESCRIPTION OF PREFERRED EMBODIMENTS

With reference now to the drawings for a better understanding of the present invention, in FIG. 1 is illustrated a dynamic electrical resistance spot welding machine generally at 10 that includes a non-conductive support 12 over which strips of conductive material 14 and 16 are fed continuously for the purpose of establishing a series of spot weld bonds therebetween. Roller members 18 may be provided to support the material as the material enters and leaves the spot welding apparatus.

A rotatable welding element 20 which may be a wheel, as illustrated, or any other appropriately configured rotatable element, is supported with its periphery 22 disposed adjacent the support 12. The rotatable element or wheel 20 is supported by a shaft 24 that is of a power supply for the journaled in a bearing aperture 26, formed through the wheel structure. The shaft 24 is in turn supported by arms 28 and 30 of the welding apparatus. In the preferred embodiment, a pair of conductive plates 32 and 34 are secured to the wheel structure 20 and are insulated from the wheel structure by insulating plates 36 and 38. A pair of brushes 40 and 42 are supported by the arms 30 and 28 respectively and are disposed in contact with the plates 32 and 34. Brushes 40 and 42 are in turn connected to conductors 44 and 46 of a power supply for the welding apparatus. The conductors 44 and 46 are connected to the output leads of a transformer 48 capable of supplying high electrical current of low voltage through the conductors 44 and 46. The input leads 50 and 52 of the transformer 48 are connected to contacts 54 and 56, representing a source of electrical potential. If desired, the electrical circuitry of the welding apparatus may be provided with a timing control 58 that is capable of achieving desired variation in the heating cycle as the material being welded travels through the spot welding apparatus.

A plurality of spaced recesses 60 are formed in the periphery of the rotatable welding element or wheel 20. Each of the recesses 60 receives a welding head, generally illustrated at 62 and illustrated in detail in FIG. 3. Each welding head comprises a body portion 64 that is received within the recess and is provided with an axial blind bore 66. A compression spring member 68 is disposed within the bore 66 and serves to bias the welding head outwardly away from the recess. The body 64 is also provided with an elongated slot 70 in which is retained a keeper pin member 72 received within a threaded aperture 74. The keeper member 72 allows axial movement of the welding head 62 within the recess 60 within limits defined by the length of the slot 70. The pin member 72, of course, prevents inadvertent separation of the welding head from the recess.

As illustrated in detail in FIGS. 3 and 4, the body 64 is cut away at one extremity thereof in order to define an elongated electrode support 76 having an aperture 78 formed therethrough. A pair of electrodes 80 and 82 are secured to the electrode support 76 by a bolt member 84 that extends through insulated apertures 86 and 88 formed in the electrode 80 and 82. Insulation 90 and 92 is interposed between the electrodes and welding head body 64 in order to isolate electric current in the electrodes. Insulation washers 94 and 96 are provided to insulate the nut and bolt head from the electrodes. A pair of electrical conductors 98 and 100 are disposed in electrical connection with respective ones of the plate members 32 and 34. It is apparent that completion of the electrical circuitry between the electrodes 80 and 82 takes place upon engagement between the electrodes and the material to be spot welded.

As illustrated in FIG. 1, the recesses 60 are angularly formed on the wheel 20 in order that the welding heads will be disposed substantially normal to the material to be welded upon initial contact therewith. As the electrode members are brought into contact with the strip material the electrical circuitry is completed as indicated above and the spot welding process begins. The direction of rotation of the welding heads and movement of the work is indicated by small arrows. As the welding element or wheel 20 is rotated along with linear movements of the strip material, the welding heads will be moved further into the recess against the bias of the compression spring 68. For purpose of discussion the linear distance the electrodes move from the time contact is established at point "a" with the strip material until the electrodes are moved out of contact with the strip material at point "b" will be referred to as the "work station." Compression between the electrodes and the material is increased rapidly during movement of the electrodes through the first portion of the work station. As rotation of the wheel 20 is continued the electrodes become inclined away from their initially normal relation with the material thereby causing mechanical pressure to be reduced, thereby lessening the contact conductivity and decreasing the electrical current which allows the weld that has been formed to solidify into a solid spot weld. Mechanical pressure is maintained between the electrodes and the strip material at all times during movement of the electrodes and the strip material through the work station. It is apparent therefore, that the attitude or angular relationship of the welding heads to the strip material cooperate with the welding head springs to achieve rapid increase in mechanical pressure through the initial portion of the work station and to allow gradual decrease in mechanical pressure during travel of the material through the remainder of the work station. This feature allows rapid welding of the strip material as it moves through the initial portion of the work station and relatively slow cooling of the material as it moves through the remainder of the work station. Heating and cooling are therefore both achieved under mechanical pressure which is varied as the material moves through the work station.

Figure 6:
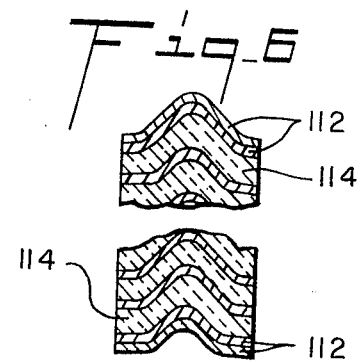
FIG. 6 is a transverse sectional view taken along line 6—6 in FIG. 5 and illustrating a gasket being manufactured by the spot welding apparatus.

With reference now to FIG. 5, a modified embodiment of the present invention is disclosed, comprising a rotatable welding element or wheel 20 constructed substantially identical with the welding element illustrated in FIG. 1. The welding apparatus of FIG. 5 differs from that illustrated in FIG. 1 in the provision of a circular mandrel illustrated generally at 102 about which the strip material is wound as it is spot welded and in the provision of flanges 103 that provide lateral containment for the strip material being wound on the mandrel. The mandrel comprises a shaft 104 that rotatably supports a hub member 106. A plurality of spokes 108 secure the hub member to an annular rim 110 about which the material to be welded is wound. Supply rolls of electrically conductive strip material 112 and non-conductive strip material 114 are arranged to allow the winding of a gasket or other suitable structure having alternate layers of conductive and non-conductive material. The conductive strip material 112 is initially fed onto the non-conductive rim 110 and as it becomes overlapped, as illustrated in the lower portion of FIG. 6, the spot welding apparatus is energized and the wheel 20 will rotate with the mandrel 102 thereby allowing a series of spaced spot welds to be formed to secure the overlapped strips into assembly. After this has been done the strip of gasket material 114 is inserted between the strips of conductive material 112 and winding is continued until proper width of the gasket has been achieved. The non-conductive material is then severed and the conductive strip material will continue to be wound until overlapping has occurred, as illustrated in the upper portion of FIG. 5. The spot welding apparatus is again energized and the rotating overlapped conductive strip material will be secured by a series of spot welds spaced about the peripheral portion thereof.

Figure 7:
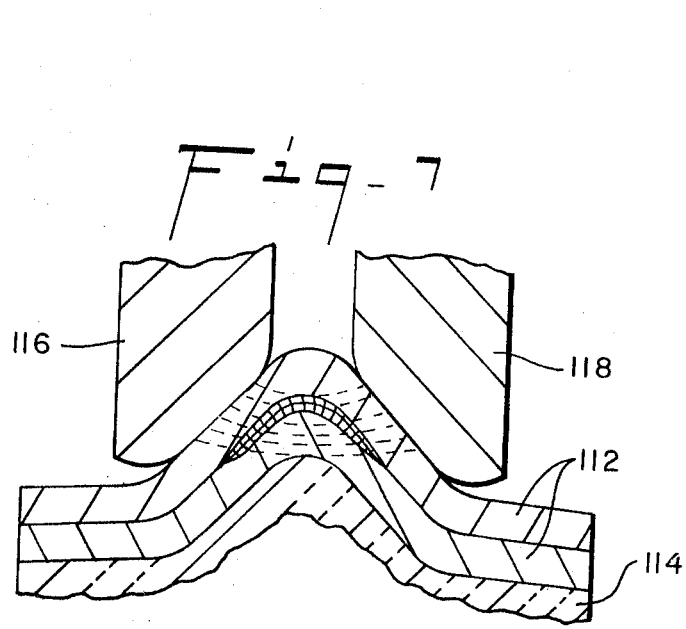
FIG. 7 is an enlarged fragmentary sectional view illustrating modified electrodes in heating contact with strip material to be welded.

As illustrated in FIG. 7, the plurality of welding heads 62 will be provided with electrodes of the configuration illustrated at 116 and 118 which interfit with the configuration of the strip material 112 as illustrated. As electrical current is passed through the superposed strips of material 112 the material will undergo a cycle of heating and cooling of sufficient duration and under sufficient mechanical pressure to insure proper fusion and solidification into a positive bond. The functions of the welding heads and electrodes during the welding operation is essentially the same as discussed above in regard to FIG. 1. It has been determined through tests that superior spot welds will be formed on strip material such as stainless steel by using apparatus constructed and operated according to the scope of the present invention.

In view of the foregoing, it is apparent that I have provided unique dynamic electrical resistance spot welding apparatus that is capable of achieving proper spot welds on strip materials moving rapidly and continuously through a work station. A proper weld is achieved by maintenance of proper mechanical pressure and by affecting slow fusion and solidification under mechanical pressure even though the strip material moves rapidly through the work station. The electrical current flowing through the material to be welded varies throughout movement of the strip material through the work station and cooperates with mechanical pressure to achieve proper fusion and solidification of the material under mechanical pressure. In the event that a different timing sequence is desired due to the thickness of the strip material being welded or to the particular type of material upon which a weld is desired this can be achieved through provision of an electrical timing sequence control. The above advantageous features have been attained while maintaining a mechanical structure that is simple in nature, reliable in use, and low in cost. It is readily understood therfore that my invention is well adapted to attain all of the objects and advantages hereinabove set forth together with other objects and advantages that are inherent in the apparatus itself. While certain representative embodiments and details thereof have been shown for the purpose of illustrating this invention it will be apparent to those skilled in the art that various changes and modifications may be made therein without departing from the spirit or scope of my invention.

I claim:

1. Dynamic electrical resistance spot welding apparatus for effecting spaced spot welds on work, means for moving said work linearly through a welding station, a support wheel carrying a plurality of angularly spaced apart welding heads, recesses provided to extend inwardly from wheel periphery into said wheel and to receive said welding heads guidably therewithin, with recess axes angled at equal angles to respective radial lines from wheel axis to respective recess axes at periphery and with yieldably urging means provided in each recess to urge the welding head in each recess in linear travel, each welding head comprising a pair of transversely spaced apart yieldably tangentially movable, welding electrodes, said wheel carrying said welding heads correspondingly with the speed of said work, said welding heads moving serially for their electrodes to be placed into compressive engagement with said work and moving a predetermined distance with said work, electrical circuitry connected to pass current successively through said respective pairs of electrodes and said work to induce resistance fusion of said work, said heads maintaining said work under compression during solidification of the fused work to insure proper spot welding.

2. Dynamic electrical resistance spot welding apparatus as recited in claim 1 which includes means for retaining said welding heads within said recesses.

3. Dynamic electrical resistance spot welding apparatus recited in claim 1 in which said circuitry includes brush means carried by said support wheel, a source of electrical potential electrically connected to said brush means, and means electrically connecting said welding electrodes to said brush means, whereby contact between said welding electrodes and said work will complete an electrical circuit across said electrodes.

4. Dynamic electrical resistance spot welding apparatus as recited in claim 1; in which said work is supported by non-conductive support means for said work defining a work station, and which includes means for correlating support wheel rotation with work movement whereby said welding heads moving into compressive engagement with said work at the beginning of said work station are maintained in contact with said work during travel of said work through said work station.

5. Dynamic electrical resistance spot welding apparatus as recited in claim 4, in which said circuitry includes means connecting said circuitry to pass current in manner that said electrodes heat said work to cause fusion thereof during travel of said work through a portion of said work station and maintain said work under compression during travel of said work through the remainder of said work station to allow proper cooling of the fused work under reduced mechanical compression.

6. Dynamic electrical resistance spot welding apparatus comprising a non-conductive support defining an elongated work station, translation means to move strip material to be spot welded continuously through said work station, a rotatable welding wheel disposed adjacent said support, a plurality of angularly spaced apart welding heads being carried by said welding wheel, recesses provided to extend inwardly from wheel periphery into said wheel and to receive said welding heads guidably therewithin, with recess axes angled at equal angles to respective radial lines from wheel axis to respective recess axes at periphery and with yieldably urging means provided in each recess to urge the welding head in each recess in linear travel, each welding head comprising a pair of transversely spaced apart, yieldably, tangentially extended electrodes, means correlating strip material travel and welding wheel rotation whereby said welding are movable corresponding with the linear speed of said strip material whereby said welding heads are moved serially into engagement with said strip material upon movement through said work station, electrical circuitry means interconnecting said electrodes with a source of electrical potential, said electrodes upon engaging said material completing the electrical circuitry across said electrodes whereby causing resistance heating of said material to achieve fusion thereof.

7. Dynamic electrical resistance spot welding apparatus as recited in claim 6; in which said circuitry means includes means connecting it to pass current in manner that upon said welding heads successively compressively engaging said material and moving therewith through said work station, the pressure of said electrodes against said material as continuously varied throughout said work station achieves heating of the material during the travel thereof through a portion of said work station to achieve fusion, and achieves solidification of the fused material during travel thereof through the remainder of said work station.

8. Dynamic electrical resistance spot welding apparatus as recited in claim 6; in which said support comprises a rotatable mandrel about which said strip material is wound.

9. Dynamic electrical resistance spot welding apparatus as recited in claim 6; whereby said electrodes will be disposed substantially normal to said material upon initial contact therewith.

* * * * *